Oct. 26, 1943.   J. LIPANI   2,333,021
QUICK-SETTING DUPLEX TOOL HOLDER
Filed Dec. 7, 1942   2 Sheets-Sheet 2
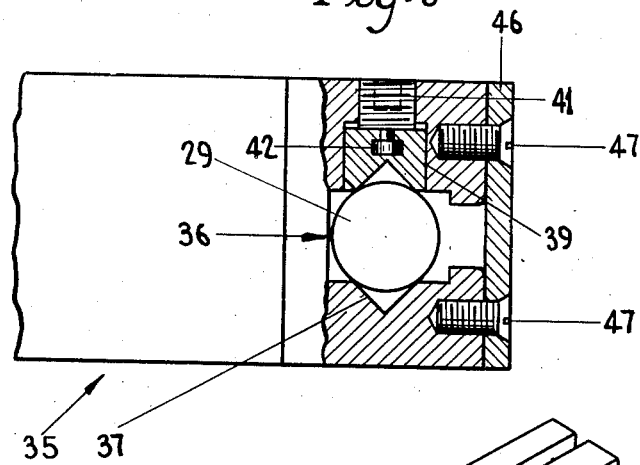
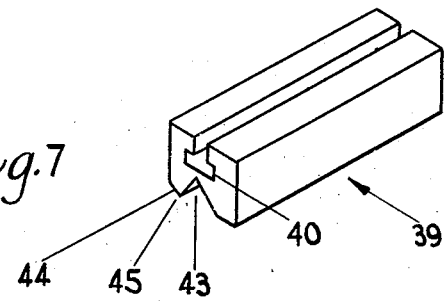
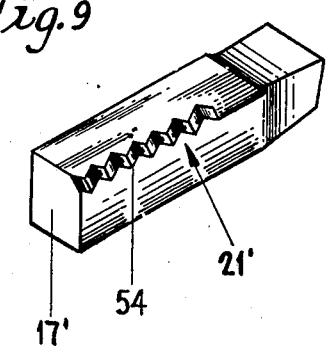
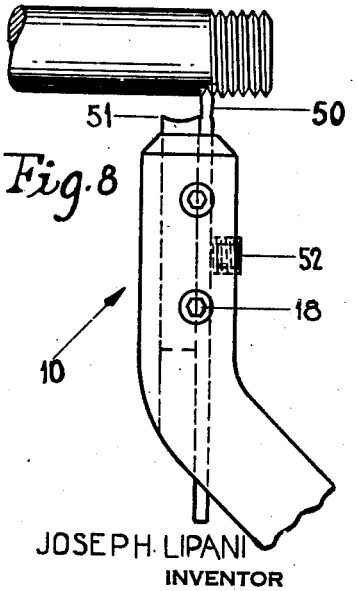
JOSEPH LIPANI
INVENTOR
BY *Joseph Blacker*
ATTORNEY Patented Oct. 26, 1943

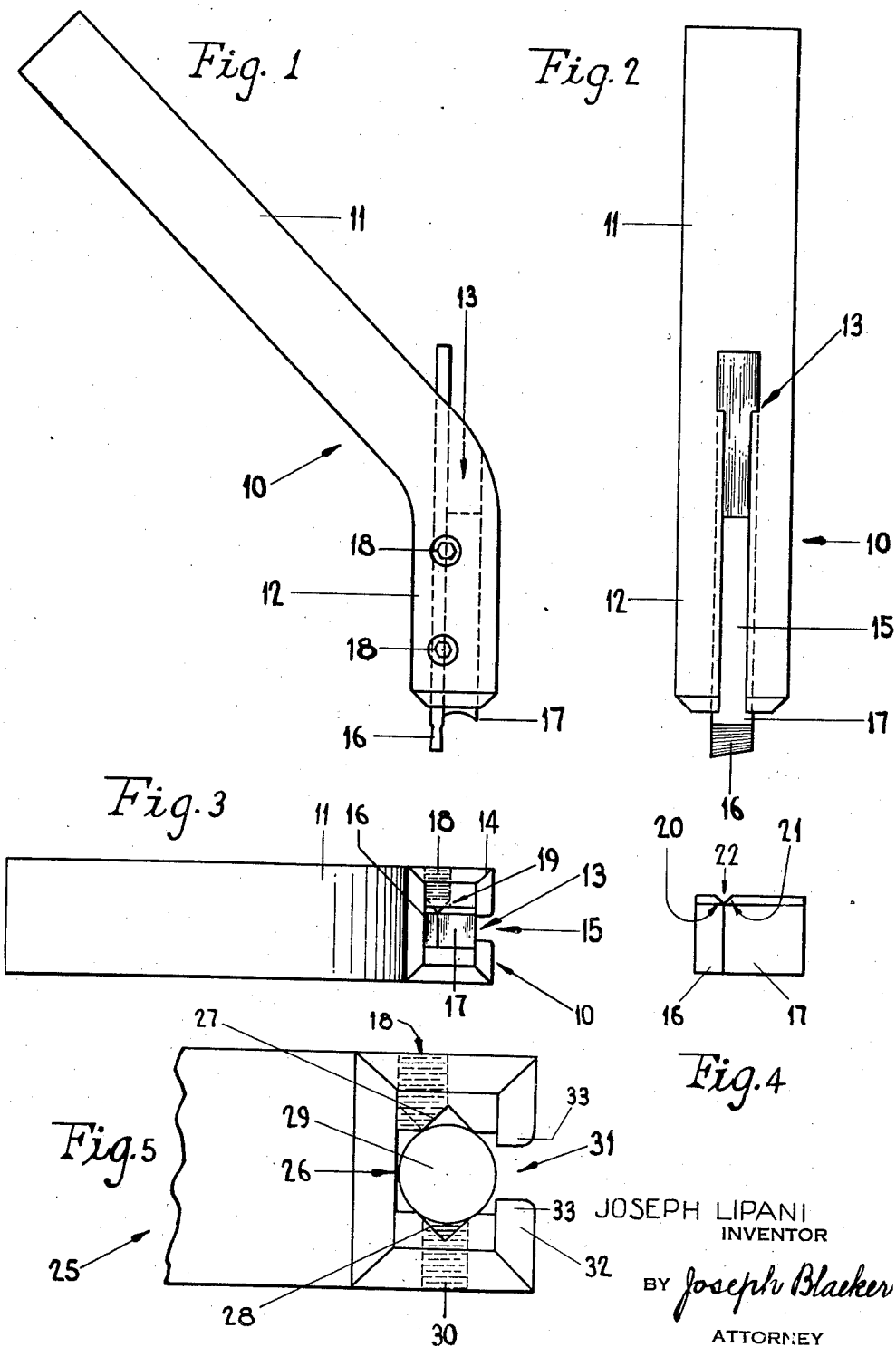

2,333,021

UNITED STATES PATENT OFFICE 2,333,021

QUICK-SETTING DUPLEX TOOLHOLDER

Joseph Lipani, Brooklyn, N. Y.

Application December 7, 1942, Serial No. 468,315

5 Claims. (Cl. 29—96)

This invention relates to a duplex tool holder for use in lathes, planers, shapers, etc., and an object of this invention is to provide a tool holding device which is adapted to support in a single slot two cutting tools used in such machines and having means for simultaneously clamping both tools in relatively adjusted positions so that only one of the tools will be in cutting position, or for simultaneously releasing both tools and without removing either of the tools from the holder.

An object of this invention is to provide a relief slot in the tool holding slot whereby the tool holding slot may be easily cleaned of dirt with a brush, etc., inserted sideways into the tool holding slot, the said relief slot serving also for the removal of broken tool bits without disturbing the setting of the tool holder in the tool post.

Another object of this invention is to provide two screws with pointed ends forming an angle of about 90 degrees and to form one lengthwise edge of each of said tools with a 45 degree bevel and to position the cutting tools in the slot so that the said edges will face each other, whereby the screws may be threaded into the slot so as to wedge the pointed ends against both beveled edges and to simultaneously clamp both cutting tools against the vertical sides of the slot.

Another object of this invention is to bend the tool holder into angular form so that the tool holding slot will extend through only one of the sides of the tool holder, the said slot being adapted to receive a narrow rectangular cutting-off tool with its bevelled edge in alinement with the pointed ends of the screws, the remainder portion of the slot being adapted to receive a tool-bit of square cross-section and with the bevelled edge in alinement with the pointed ends of the screws, whereby upon threading the screws into the slot both tools will be simultaneously clamped, and upon threading the screws out of the slot both tools will be simultaneously released to permit either of said tools to be selectively brought forward into cutting position and quickly clamped in the tool holder without removing either of the tools from the tool holder.

Another object of this invention is to provide V-shaped grooves in the upper and lower faces of the tool holding slot and in which a boring bar of circular cross-section may be seated in linear alinement, and to provide means for clamping the boring bar or the cutting tools in the tool holder, whereby a single tool holder is adapted to be used for all cutting operations such as straight turning, thread cutting, internal boring, and for cutting off the finished product.

With the above and other objects in view, the invention will be hereinafter more particularly described and the combination and arrangement of parts will be shown in the accompanying drawings and pointed out in the claims which form part of this specification.

Reference will now be had to the drawings, wherein like numerals of reference designate corresponding parts throughout the several views, in which:

Figure 1 is a top plan view of the tool holder.

Figure 2 is a side elevation of the tool holder shown in Figure 1.

Figure 3 is an end view of the tool holder.

Figure 4 is an end view on an enlarged scale, of two coacting cutting tools having beveled clamping edges.

Figure 5 is a fragmentary portion of a modified tool holder, on an enlarged scale.

Figure 6 is an end view of a fragmentary portion of a modified tool holder on an enlarged scale, showing unitary clamping means for clamping two coacting cutting tools or for clamping a boring bar in the tool holder, the head of the tool holder being broken away to show the clamping means.

Figure 7 is a perspective view of the clamping means shown in Figure 6.

Figure 8 is a top plan view of a fragmentary portion of the tool holder shown in Figure 1, showing a thread cutting tool supported therein.

Figure 9 is a perspective view of a modified cutting tool having serrations along a portion of a bevelled edge.

In the illustrated embodiment of the invention, the numeral 10 indicates a tool holder comprising a shank 11, of rectangular cross-section and preferably bent in angular form to provide an angular shank extension 12.

As best shown in Figure 2, the angular extension 12 has a through slot 13. The slot 13 is longer in horizontal direction in comparison with its height. One of the vertical sides 14 defining the slot 13 has a relief slot 15 extending from end to end of the slot 13.

As shown in Figures 1 to 3 inclusive, the slot 13 is adapted to receive a cutting-off tool 16, preferably extending outwardly at both ends of the slot. A tool-bit 17, preferably of square cross-section is adapted to enter into the remainder portion of the slot 13.

Socket head screws 18 threaded into the upper portion of the tool holder 10, are adapted to move vertically into the slot 13. The screws 18 have bevelled lower ends 19. For the purpose of clamping the cutting tools 16 and 17 in the slot 13, the cutting tool 16 has a bevelled upper edge 20 and the cutting tool 17 has a similar bevelled upper edge 21 facing the bevelled edge 20. The angle 22 formed between the bevelled edges 20 and 21 is made to correspond to the angle at the bevelled lower ends of the screws 18.

In assembled relation, best shown in Figure 3, the bevelled lower end 19 of the screw 18 is shown in forced contacting relation with both bevelled edges 20 and 21, of the cutting tools 16 and 17, whereby both cutting tools are simultaneously clamped in the tool slot 13 when the screws 18 are threaded into the said slot.

Under operating conditions it is necessary to very thoroughly clean the slot 13 so that the cutting tools will seat squarely, and for this purpose the relief slot 15 permits a brush to be inserted sideways into the slot 13. The relief slot 15 also serves for quickly removing broken tool bits from the slot 13.

It is to be noted that the tool holder 10 is thus designed for receiving two cutting tools in clamped relation therein and so that both of the cutting tools may be clamped therein simultaneously, or both cutting tools may be released simultaneously to permit either of said coacting tools to be selectively brought forward into cutting position and quickly clamped in said tool holder without removing either of the said tools from the tool holder.

As shown in Figure 5, there has been provided a modified tool holder 25 having a through slot 26, similar to the slot 13. The upper and lower faces defining the slot 26 have V-shaped grooves 27, 28, lengthwise thereof. The grooves are in superposed alinement and arranged so as to be adapted to receive and support the shank of a boring bar 29. Screws 30 threaded in suitably spaced relation in the lower portion of the tool holder 25, serve to clamp the boring bar 29 in operating position in the tool holder 25. A relief slot 31 is provided in the side wall 32, similar to the relief slot 15 in the tool holder 10. The relief slot 31 is defined by lips 33.

It is to be noted that the tool holder 25 may be used either with the coacting cutting tools 16 and 17, or with the boring bar 26. The screws 18 shown in Figure 5 are positioned in the position shown in Figure 1, that is, in alinement with the angle 22 and in operating relation with the bevelled edges 20 and 21 of the cutting tools 16 and 17.

As shown in Figure 6, there has been provided a modified tool holder 35 having a through slot 36, similar to the slots 13 and 26 in the tool holders 10 and 25. One horizontal face defining the slot 36 has a V-shaped groove 37 lengthwise thereof, similar to the V-shaped grooves in the tool holder 25.

For the purpose of clamping the boring bar 29 or the two co-acting cutting tools 16 and 17 along an extended length thereof there has been provided a key 39 vertically movably mounted in a portion of the tool holder 35 opposite the groove 37.

As best shown in Figure 7, the key 39 has a T-shaped slot 40 extending throughout its length. A screw 41, having a T-shaped extension 42 at its lower end is adapted to enter into the slot 40. The portion of the key 39 opposite the slot 40 has a V-shaped groove 43 centrally thereof and extending throughout its length. The key 39 also has a beveled edge 44.

It is to be noted that the angle formed between the beveled edge 44 and one of the side faces of the V-shaped groove 43 is of the same number of degrees as the angle 22 between the cutting tools 16 and 17.

It will thus be seen that the tool holder 35 may be used either with the co-acting cutting tools 16 and 17 by lowering the key 39 so that the downwardly extending V-shaped edge portion 45 will come in contacting relation with the beveled edges 20 and 21 of the cutting tools 16 and 17, to cause simultaneous clamping of said tools in the tool holder. By rotating the screw 41 so as to raise the key 39 away from the said cutting tools, the said tools will be simultaneously released to permit either of the tools to be selectively brought forward into cutting position and clamped. The key 39 is also adapted to be used for clamping the boring bar 29 so that the side walls of the centrally positioned V-shaped groove 43 will clamp the boring bar against the opposite V-shaped groove 37 in the tool holder 35.

For the purpose of reinforcing the slotted lipped portion of the tool holder 35 when used for very heavy cutting, I have shown a bar 46 fixed to the said slotted portion by screws 47. It is to be noted that the bar 46 is preferably of rectangular cross-section and is only slightly larger along its width than along its thickness so that as little as possible of the length of the slot 36 is obstructed. This permits a brush to be inserted into the slot for cleaning it.

Figure 8 shows the tool holder 10 having a thread cutting tool 50 set in operating position. A turning or forming tool 51 is also held in the tool holder shown in Figure 8. It is to be noted that while I have shown the thread cutting tool 50 and the screws 18 on the right hand side of the tool holder 10, that I may place the thread cutting tool and the screws on the left side of the tool holder.

Figure 9 shows a tool bit 17' similar to the tool bit 17 and modified so that a portion of the bevelled upper edge 21' has angular serrations 54. The serrations are of a size so that the bevelled or pointed lower ends 19 of the screws 18 can seat between any two coacting serrations. It is to be noted that both cutting tools 16 and 17 have their bevelled edges serrated and so that a screw 18 can be threaded into contacting relation between the tools 16 and 17 to positively interlock both of said tools in any desired relatively adjusted relation between said cutting tools.

It is to be noted that the cutting tools and the tool holders shown herewith are always in horizontal position which is especially of advantage when cutting threads. A desirable advantage of the tool holders herewith shown is that they permit placing the cutting tools very close to the face plate.

In accordance with the patent statutes I have described and illustrated the preferred embodiments of my invention, but it will be understood that various changes and modifications can be made therein without departing from the spirit of the invention as defined by the appended claims.

I claim:

1. In a quick-setting duplex tool holder, comprising an angular bar of rectangular cross-section, a through slot in one lengthwise side of said holder, said slot being defined by oppositely facing lips at one vertical face of said holder, the upper portion of said holder having screws threaded therein and movable into said slot, a narrow rectangular cutting-off tool having a bevelled wall and being adapted to enter into said slot, a tool-bit of square cross-section adapted to enter into the remainder portion of said slot and having a bevelled upper edge facing the beveled edge of said cutting-off tool, said screws having bevelled lower ends and being positioned so as to simultaneously clamp both of said cutting tools or to simultaneously release both of said tools to permit either of said tools to be selectively brought forward into cutting position and quickly clamped in said holder against the sides of said slot without removing either of said tools from said tool holder.

2. In a quick-setting duplex tool holder, comprising an angularly bent bar of rectangular cross-section, a through slot in one lengthwise side of said holder, said slot being defined by oppositely facing lips at one vertical face of said holder, the upper portion of said holder having screws threaded therein and movable into said slot, a narrow rectangular cutting-off tool having a beveled upper edge and being adapted to enter into said slot, a tool-bit of square cross-section adapted to enter into the remainder portion of said slot and having a beveled upper edge facing the beveled edge of said cutting-off tool, said screws having beveled lower ends and being positioned intermediate said beveled edges so as to simultaneously clamp both of said tools to permit either of said tools to be selectively brought forward into cutting position and quickly clamped in said holder against the sides of said slot without removing either of said tools from said tool holder.

3. In a quick-setting duplex tool holder, comprising an angularly bent bar of rectangular cross-section, a through slot in one lengthwise side of said tool holder, said slot being defined by oppositely facing lips at one vertical face of said tool holder, the upper portion of said tool holder having screws threaded therein and movable vertically into said slot, a narrow rectangular cutting-off tool having a bevelled upper edge and being adapted to enter into said slot, a tool-bit of rectangular cross-section adapted to enter into the remainder portion of said slot and having a bevelled upper edge facing the bevelled upper edge of said cutting-off tool, said screws having bevelled lower ends and being positioned intermediate said bevelled edges so as to simultaneously clamp both of said tools or to simultaneously release both of said tools to permit either of said tools to be selectively brought forward into cutting position and quickly clamped in said tool holder against the sides of said slot without removing either of said tools from said tool holder.

4. In a quick-setting duplex tool holder, comprising an angularly bent bar of rectangular cross-section, a through slot in one lengthwise side of said tool holder, the upper portion of said tool holder having screws threaded therein and movable vertically into said slot, a rectangular cutting-off tool having a beveled upper edge and being adapted to enter into said slot, a tool-bit of rectangular cross-section adapted to enter into the remainder portion of said slot and having a beveled upper edge facing the beveled upper edge of said cutting-off tool, said screws having beveled lower ends and being positioned intermediate said beveled edges so as to simultaneously clamp both of said tools or to simultaneously release both of said tools to permit either of said tools to be selectively brought forward into cutting position and quickly clamped in said tool holder without removing either of said tools from said tool holder.

5. A duplex tool holder comprising a bar having slot means, a portion of said tool holder having screws threaded therein and movable into said slot means, a rectangular cutting-off tool having a bevelled edge and being adapted to enter into said slot means, a tool-bit of rectangular cross-section adapted to enter into the remainder portion of said slot means and having a bevelled edge facing the bevelled edge of said cutting-off tool, said screws having bevelled ends and being positioned intermediate said bevelled edges so as to simultaneously clamp both of said tools or to simultaneously release both of said tools to permit either of said tools to be selectively brought forward into cutting position and clamped in said tool holder without removing either of said tools from said tool holder.

JOSEPH LIPANI.